Figure 1:
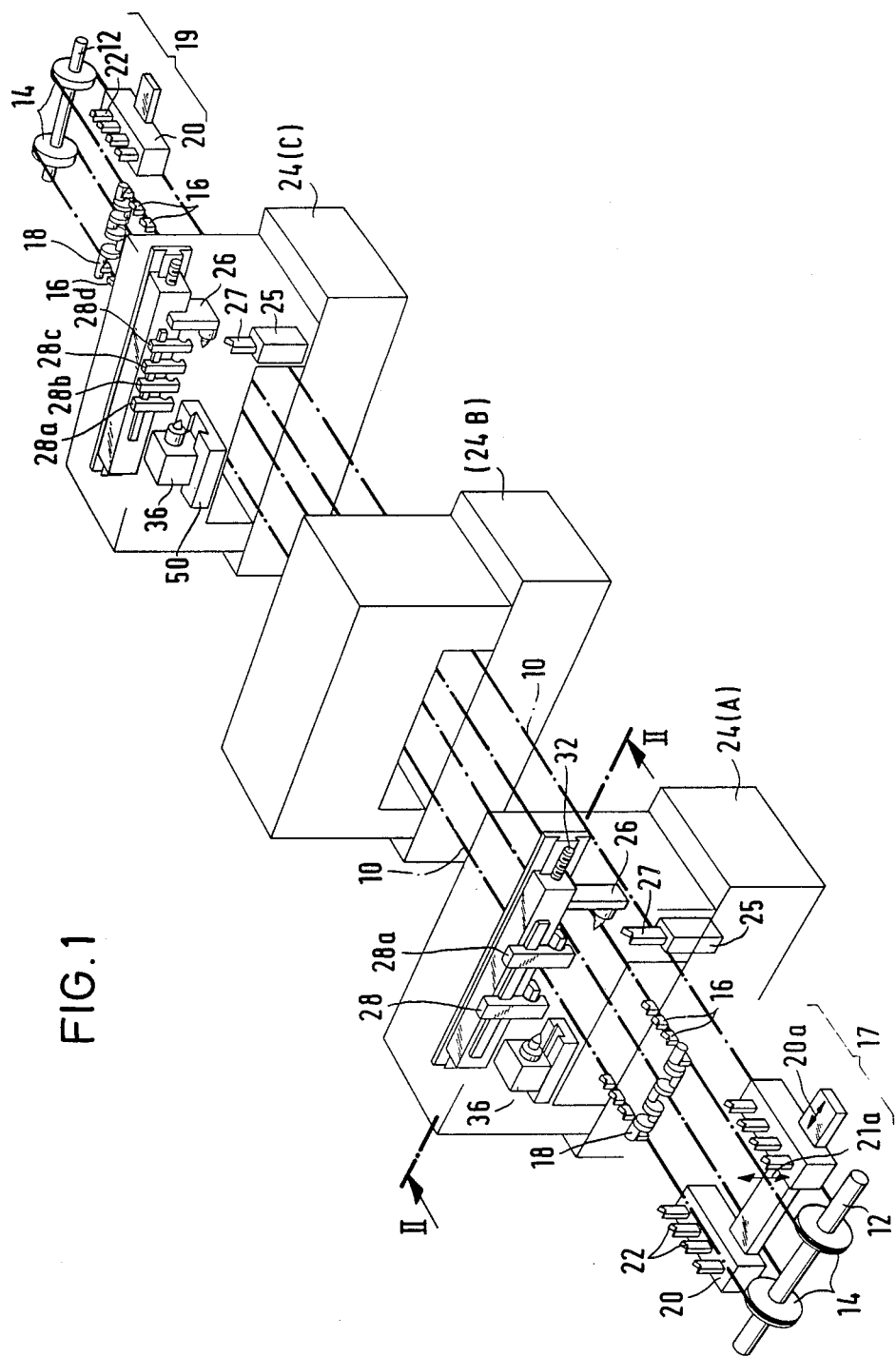

United States Patent [19]

Weber

[11] Patent Number: 4,963,164
[45] Date of Patent: Oct. 16, 1990

[54] MACHINE FOR SURFACE TREATMENT WITH MEANS FOR POSITIONING PROCESSING TOOLS

[75] Inventor: Wilfried Weber, Freudenstadt, Fed. Rep. of Germany

[73] Assignee: Maschinenbau Grieshaber GmbH & Co., Wolfach, Fed. Rep. of Germany

[21] Appl. No.: 278,037

[22] Filed: Nov. 30, 1988

[30] Foreign Application Priority Data

Nov. 30, 1987 [DE] Fed. Rep. of Germany ....... 3740597

[51] Int. Cl.⁵ .............................................. B24B 5/04
[52] U.S. Cl. .................................. 51/154; 51/105 SP; 51/236
[58] Field of Search ......... 51/215 M, 215 E, 215 VE, 51/105 SP, 281 C, 289, 326, 327, 154, 236; 198/346.2, 817, 803.14, 468.8, 433, 429

[56] References Cited

U.S. PATENT DOCUMENTS 1,993,543 3/1935 Egger ..................................... 51/154
2,895,354 7/1959 Hawkinson ....................... 198/346.2

FOREIGN PATENT DOCUMENTS 0873363 4/1953 Fed. Rep. of Germany .......... 51/67
0595115 11/1947 United Kingdom ............ 51/105 SP

*Primary Examiner*—Robert A. Rose
*Attorney, Agent, or Firm*—Dennison, Meserole, Pollack & Scheiner

[57] ABSTRACT

The present invention relates to a machine for automatic processing of workpiece surfaces. It relates in particular to means which allow the automatic positioning of tool holders which carry the tools necessary for processing the workpieces. These tools, including the necessary feed means, are accommodated in cassettes for accelerated exchange.

4 Claims, 3 Drawing Sheets

MACHINE FOR SURFACE TREATMENT WITH MEANS FOR POSITIONING PROCESSING TOOLS

The present invention relates to a machine for automatically processing workpiece surfaces and—more specifically—to a machine for surface treatment with means for positioning processing tools. The workpieces can be, for example, camshafts or crankshafts. The processing machine and positioning means is described in the following example, on the basis of these shaft-like workpieces. In their axial distance from each other, shafts of this kind have rotationally symmetrical surfaces which form bearings. In these bearings, the shaft itself is mounted or other parts of a machine are arranged around these bearings, for instance the big ends of pistons of an internal combustion engine or a pump or a compressor.

It is known to subject these rotationally symmetrical surfaces to an abrasive surface treatment by grinding or superfinishing them in order to improve the roundness and surface finish. A superfinishing stone is put on the place to be processed and adjusts to the curvature of the workpiece at this place. The stone then vibrates in axial direction. The workpiece rotates. It is also known, however, to use an abrasive belt instead of the stone-type tool or in addition to a profiled stone (US-PS 19 08 048), by which a lapping treatment of the surface is made possible. Other grinding processes may also be used.

It is, furthermore, known with shaft-like workpieces to conduct the processing of all axially parallel bearing places at the same time, also, for instance, when processing crankpins, whose circularly symmetrical surfaces are moved along the crank radius around the axis of the shaft. Then it is necessary to provide means which follow this deflection (US-PS 2 270 522 or US-PS 1 993 543).

The simultaneous processing of all bearing places of one shaft, however, does not meet the requirements, which have risen due to the increasing degree of automation, in the rapid production of such finished shafts of highest quality as single parts in a production process for prime movers and processing machines. Fully automatic or almost fully automatic processes rather require the fixed-cycle processing and provision of similar workpieces such as camshafts or crankshafts. Nonetheless, an automatic processing machine must be easily adjustable to the processing of different workpieces by a simple change-over thereto.

With any kind of shafts to be processed, however, also mixed operation should be possible. It should be possible without the necessity of extensive changes to process and finish camshafts of random lengths and random shapes, i.e. with different distances between the cams and the beginning and the end of the camshaft as well as between the bearing surfaces between the cams, such that shafts with entirely unprocessed bearing places can be put in the machine and—after automatic processing in the machine—taken out of it ready for installation. Putting the shaft in and taking it out again should also take place automatically. To this end, input and output stations must be provided. This requirement applies to both camshafts and crankshafts. For both components, it must be possible to process different kinds of bearing places. At least one bearing place of a random kind of shaft, for example, has radial surfaces to be processed in order to take up axial forces or in order to prevent axial clearance. These radial surfaces, just like annular spherical surfaces of partly considerable, at any rate of different axial extension, must also be processed. Edge zones must also be processed, even though these edge zones have curvature radii.

For this reason, the first step for the solution of the problem consists in the provision of a machine with several stations. Of course, machines featuring several stations, which conduct different processing steps on the same workpiece, are already generally known.

In US-2,813,381, for example, a camshaft grinding machine is described which has a central chain conveyor that runs past the side of the individual processing stations. The camshafts are then lifted by a crane to the individual processing stations, whereby the camshafts can also be stored intermediately.

The DE-31 11 755 describes a crankshaft grinding device, in which a raising conveyance means is used in order to transport the crankshafts to be processed to the processing means, the raising conveyance means in turn running next to the processing stations. The crankshafts can also be turned around by the conveyance means.

The DE-82 08 343 describes a transport means for shaft-like workpieces, in which an endless conveyor with two parallel belts is used. In this case, pallets which are hung up or rest on the conveyor are used for storing the workpieces.

The DE-31 41 784 describes a means for conveying stators of electrical machines to and fro, in which also an endless chain conveyor is used which runs past the processing stations.

The US-1,047,136 describes a transporting means for thread reels of sewing machines. A parallelly movable belt is used as conveying means here.

In the US-2,813,380 another camshaft grinding machine is described, in which the chain conveyor runs along the side of the processing machines as in US-2,813,381. The camshafts are then lifted by crane from the chain conveyor to the individual processing stations.

Furthermore, two magazine articles describe general features regarding the state of the art of the grinding machines used nowadays. The articles were published in VDI-Z, vol. 127, No. 23/24, pages 957–963 and in "wt-Z industrielle Fertigung" 75, 1985, No. 12, pages 737–741.

However, no machine is known in which the rotationally symmetrical bearing surfaces, which are distributed axially along the length of the shaft, of axially longitudinally extending parts such as camshafts or crankshafts for prime movers or processing machines undergo a superfinishing process in several processing stations. In this case, the stations one behind the other are arranged in parallel to the parts. The stations are connected via an endless conveyor which runs transversely to the stations and the parts. The stations which are arranged one behind the other cover the endless conveyor which connects them and they are each in principle constructed in the same way.

They each basically feature a random plurality of single processing means which are exchangeable each in order to make a flexible system possible. A further particularity consists in the single processing means being able to at first take a lateral parking position.

In the parking position, all processing means, which are not required, can be locked and also deposited side by side. From this parking position and still laterally to the processing position, the processing means can be adjusted to the exact distances from each other after unlocking. This is achieved by moving the individual processing means on a support carrying all the means, the support being provided in the longitudinal direction in each processing station. This support is situated transversely to the endless conveyor and in parallel to the shaft-like workpieces. By means of a mechanical means, a threaded shaft provided with an electric rotary drive unit, a pneumatic or hydraulic means, the processing means on the support can be moved into the desired position relative to each other, with one unlocked means being moved at a time relative to the other locked means. The locking can be an index means or a clamping means. When all the processing means are spaced at their exact distances from each other corresponding to the distances of the rotationally symmetrical surface sections on the shaft-like workpiece, then the support, on which all the processing means are mounted, can be moved in parallel to itself to a length in the processing station until its exact position towards the workpiece has been reached. The movement can advantageously be caused by the same means which also adjusted the distances between the individual processing means on the support. The support can also be locked relative to the processing station.

A further advantage is that a random number of processing means can be positioned on the support. Thus the flexibility of the machine is increased. It is possible, for example, to position and operate only one or only two processing means on the workpiece per processing station. The remaining processing means rest locked in their parking position next to the workpiece or next to its clamping resp., so that these do not obstruct the momentarily used processing means and are at the same time readily available when needed.

The processing of the workpieces can be effected by the majority of the stations positioned along the endless conveyor either in a multi-stage process such that in a following station a secondary treatment of the same surface is carried out or that single processing surfaces which are spaced too closely and cannot be processed in one station due to their geometrical closeness, can be processed in different subsequented stations, or individual stations can be provided for special treatment.

A special treatment can, for example, consist in that in this station the workpiece is not only made to rotate but that it is also made to move backwards and forwards axially at the same time. In this way, the rotationally symmetrical bearing surface of a shaft like workpiece can advantageously be ground diagonally.

The rotating direction of the workpiece can, moreover, be reversed.

The processing means is exchangeable, as already mentioned above, in order to render the machine more flexible by making the use of different processing means possible. In this manner, conventional superfinishing devices with oscillating stones mounted on a pivoted arm can, for example, be used as processing means. This device or other devices can be installed in the processing means in such a way that during processing, the profiled stones follow the bearing place of a big end bearing which revolves around the axis of a rotating crankshaft.

Instead of a superfinishing device, also a belt finishing device of a small structure with a supply of abrasive belt on reels can be used. Belt finishing devices of this type are basically known. Their adaptation to a machine according to the present invention, however, requires solutions which cannot simply be derived from known art, but which need particular considerations.

A belt finishing device, which can be installed in the machine according to the present invention, for example, comprises pneumatically or hydraulically closable tongs, which grip the rotationally symmetrical surface to be processed as soon as the device is in position. The surface to be processed is moved into the open position of the tongs by the endless conveyor, as will be described in more detail hereinafter. The tongs close upon the action of a pressurized working medium and thus the required contact pressure is obtained. According to the invention, the opening and closing motion of the tongs is used for advancing the abrasive belt by the required amount for the next processing step.

Two leads for the medium to the device are provided which extend into an attachment part which remains connected with the support of the station of the machine, ending in the form of a fitting and sealing surface with a check valve, so that no medium can exit as long as the device is not installed in the machine. When the device is mounted, the valves open and the pressure contact is there.

This belt finishing device, moreover, has the special feature that the tightened belt is led via a guide roller, which has a groove in its perimeter. In the case of a belt failure, a measuring pin under spring load falls into the groove, thereby causing an error message, which stops the machine.

The different processing tools used are accommodated in cassettes. When a belt finishing device is used, for example, these cassettes also accommodate the abrasive belt together with the corresponding material supplies and conveying means. This ensures fast and uniform changing of the processing tools.

Further details, features and advantages of the invention can be gathered from the following description of a schematic drawing of an example of embodiment and its additions. The workpieces to be processed are in this case crankshafts/camshafts.

Figure 2:
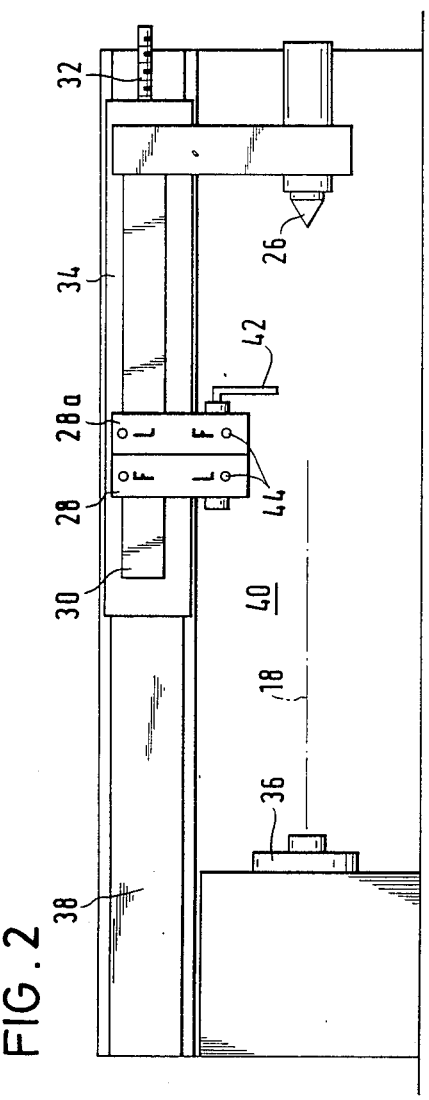
Figure 3:
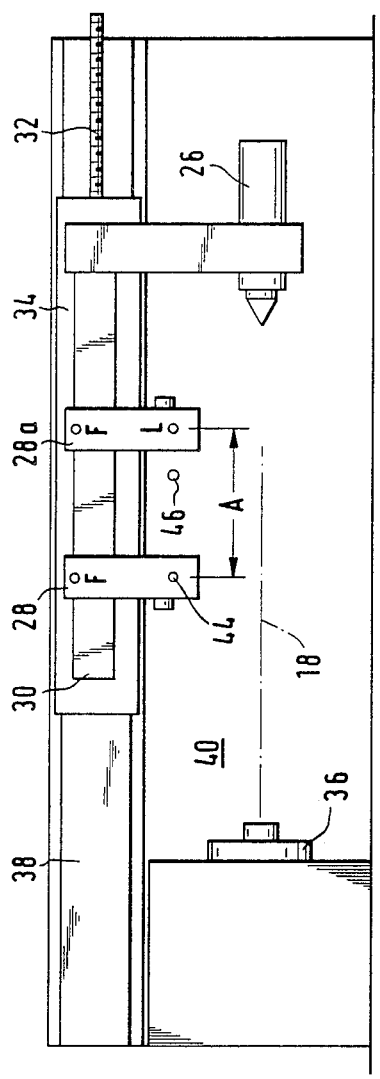
Figure 4:
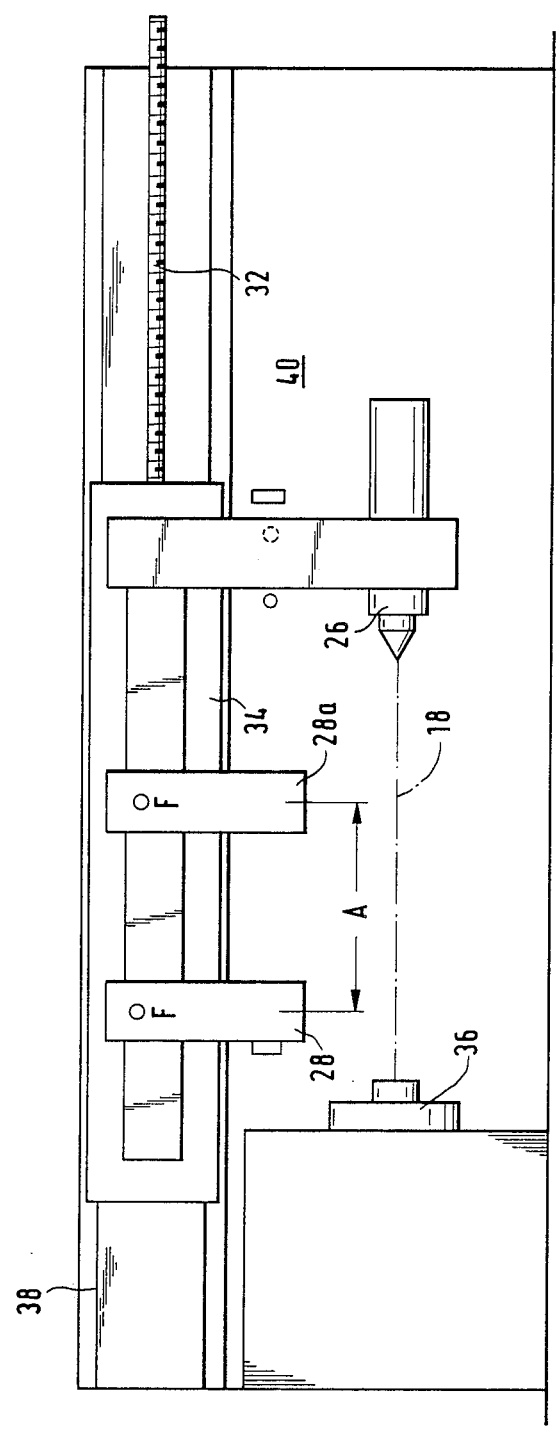

FIG. 1 is a schematic perspective of the cooperation of the essential parts of the machine FIG. 2 is a schematic section through a processing position along the line II—II in FIG. 1, the scale has not been kept here FIG. 3 shows the same section as FIG. 2, but in a different position, and FIG. 4 shows the same section as in FIG. 2, but in a working position ultimately directed to the workpiece.

FIG. 1 shows a partially schematic total perspective of a multi-station finishing machine. It consists of an endless chain conveyor which is formed of two identical single chains 10. Via the chain conveyor 10 the workpieces 18 are transported to the individual processing stations 24. For processing and potential intermediate storing in these working stations 24, the workpieces 18 are lifted from the chain conveyor 10 by a lift 25, 27. The workpiece 18 is lifted to the level of a tailstock 26 and clamped between the latter and an axially movable chuck spindle 36. The chuck spindle 36 is connected with a drive in order to rotate the workpiece 18 around its axis. Workpieces such as crankshafts or camshafts have several bearings, which are processed by several parallel grinding tools simultaneously. In order to be able to process different crankshafts or camshafts, the individual grinding tools can be positioned freely relative to each other, as it can be gathered from FIGS. 2 to 4. This positioning system comprises a support 30, on which the workpiece holders 28 are mounted and can be moved and locked thereon. This support 30 is mounted on a carriage 34 which can in turn be moved by a threaded spindle 32.

The movable carriage 34 is led in a carriage guide 38. The headstock 26 is firmly connected with the carriage 34. The tool holders 28 can be additionally fixed in their idling position by means of index pins 44, which engage in the corresponding index holes 46 in the machine frame 40.

During each change of the workpiece, a new positioning of the tool holders 28 is necessary, which takes place as follows: the tool holders 28 mounted on the support 30 are unlocked. The carriage 34 is moved into its right final position via the threaded spindle 32.

The tool holders 28 are lined closely next to each other by means of a final stop 42 fixed on the machine frame 40. In this idling position, the tool holders 28 are fixed to the machine frame 40 by means of index pins 44, which engage in index holes 46 in the machine frame 40. Then the tool holder 28 closest to the workpiece 18 is clamped onto the support 30 and at the same time its index pin 44 is unlocked (L). The carriage 34 is now moved by the threaded spindle 32 in the working room by a certain amount so that the distance A to the next tool holder 28a, which is still in the idling position with its index pins 44 on the machine frame 40, equals the distance A between two bearing places of the workpiece 18. The next idling tool holder 28a is unlocked from the machine frame 40 (L) and clamped onto the support 30 (F). The carriage 34 now moves farther into the working room until the next desired distance is adjusted. In this manner, all tool holders 28 are moved into their desired position relative to each other. The carriage 30 as a whole can then also be moved to the crankshaft 18 separately (FIG. 4).

The lengths of the distances of the individual tool holders 28 is proportional to the number of rotations made by the threaded spindle 32 and in this simple manner it is possible to subject it to a programmable control.

The tool holders 28 in the form of exchangeable cassettes can accommodate different kinds of grinding tools, such as stone holders or grinding means with an abrasive belt which is pressed to the shaft by means of pressing shoes. It is also possible to turn the grinding means by 90° for fine machining of vertical surfaces.

The third processing station 24 (C) shown as an example in FIG. 1 features four tool holders 28a–d. In this station 24 (C) the workpiece 18 can also be moved backwards and forwards axially in addition to the rotating movement effected by drive 36. For this purpose, the drive 36 can be moved in its carriage 50 and the tailstock 26 can also be moved freely in the same axial direction against the action of a spring. In this manner, the bearing places can be ground diagonally in the shape of a cross.

I claim:

1. Machine for superfinishing rotationally symmetrical surface sections on shaft-like workpieces, preferably for treating the surfaces of bearing places on cam shafts or crankshafts with means for positioning the processing tools characterized in a plurality of processing stations (24A, 24B, 24C...) disposed parallel to each other, different shaft-like workpieces (18) which extend in a line parallel to said stations, means for conveying said workpieces to said stations, a plurality of workpiece processing means, carriage means (34) for carrying said workpiece processing means, said carriage means being adjustably mounted for movement parallel to said stations between randomly selected positions, whereby said workpiece processing means are spaced from each other and positionable with said carriage means (34) relative to said workpieces, a rotatably mounted, driven workpiece clamping means and a tailstock (26) arranged in axial alignment with said clamping means, said workpieces (18) disposed in clamped relationship between said clamping means and said tailstock, a random number of exchangeable processing tools (28) for radially gripping the surfaces of said workpieces to be processed, and said tailstock mounted on each of said carriage means (34).

2. Machine for the fine machining of shaft-like workpieces such as camshafts or gear shafts of different lengths and having bearing surfaces thereon spaced from each other at predetermined distances comprising:
    a frame;
    means on said frame for supporting said workpieces on a tailstock and advancing them step by step for machining in a work area defined by said frame;
    a support mounted transversely to and above the path travelled by said workpiece while being advanced;
    at least two tool holder means lockably mounted on said support for bidirectional movement relative to each other and to said support in a direction longitudinally of said workpieces;
    carriage means guided on said frame for shifting said support and said tool holder means into and out of said work area;
    means for selectively and releasably coupling said tool holder means to said support and to said frame;
    spindle means for moving said carriage means, said support, and said tool holder means to an idling position out of said work area for each type of workpiece selected for machining;
    stop means for arresting movement of said tool holder means, said support, and said carriage means when said carriage means reaches said idling position;
    and control means operably connected to said spindle means for returning said carriage means to said work area and to a position in which said tool holder means are spaced from each other a distance equal to the distance between two adjacent bearing surfaces on said workpieces.

3. Machine according to claim 2, in which said spindle means is rotatable through an angle storable in and retrievable from a programmable memory means.

4. Machine according to claim 3, in which said tailstock is coupled to said carriage means and carried into clamping engagement with said workpiece once said tool holder means have been positioned.

* * * * *